US008894454B2

(12) United States Patent
Lorang

(10) Patent No.: US 8,894,454 B2
(45) Date of Patent: Nov. 25, 2014

(54) INDEPENDENT MODULE FOR PRODUCING POWER FOR A SHIP, AND ASSOCIATED SHIP ASSEMBLY

(75) Inventor: Matthieu Lorang, Saint Pere en Retz (FR)

(73) Assignee: STX France S.A., Saint Nazaire (FR)

( * ) Notice: Subject to any disclaimer, the term of this patent is extended or adjusted under 35 U.S.C. 154(b) by 198 days.

(21) Appl. No.: 13/263,612

(22) PCT Filed: Apr. 9, 2010

(86) PCT No.: PCT/EP2010/054696
§ 371 (c)(1),
(2), (4) Date: Nov. 17, 2011

(87) PCT Pub. No.: WO2010/115977
PCT Pub. Date: Oct. 14, 2010

(65) Prior Publication Data

US 2012/0060741 A1 Mar. 15, 2012

(30) Foreign Application Priority Data

Apr. 10, 2009 (FR) ..................................... 09 52408

(51) Int. Cl.
*B63H 13/00* (2006.01)
*B63B 35/70* (2006.01)

(52) U.S. Cl.
CPC ..................................... *B63B 35/70* (2013.01)
USPC .............................................................. 440/8

(58) Field of Classification Search
USPC .......................................... 114/263; 440/6, 8
IPC ............ Y02T 70/58; B63B 13/00; B63H 13/00
See application file for complete search history.

(56) References Cited

U.S. PATENT DOCUMENTS 3,922,993 A 12/1975 Bludworth
3,934,531 A * 1/1976 Allen .............................. 114/63
5,417,597 A * 5/1995 Levedahl .......................... 440/6
6,199,501 B1 3/2001 Kuhlman
2008/0272605 A1* 11/2008 Borden et al. .................. 290/55

FOREIGN PATENT DOCUMENTS

DE 314 095 8/1919
EP 2 106 999 10/2009
GB 949645 2/1964
JP 60-35686 2/1985
NL 8 502 841 5/1987
WO WO 01/49562 7/2001
WO WO 2010/055010 5/2010

* cited by examiner

*Primary Examiner* — Stephen Avila
(74) *Attorney, Agent, or Firm* — Harness, Dickey & Pierce, P.L.C.

(57) ABSTRACT

The disclosure relates to a module for producing electric power for a main ship, capable of supplying the power required to propel the main ship, the module being produced in the form of a secondary ship separate from the main ship and including a power plant, the secondary ship being provided with an electrical connector for establishing an electrical connection between the power plant and the main ship and a lock for interlocking with the main ship in order to secure the former from moving from the main ship, the electrical connector being suitable for supplying electric power to the propulsion motor of the main ship.

16 Claims, 4 Drawing Sheets

11
3
2
4
5
6a
7
1

1
2
3
7
6a
5
11
12
4

INDEPENDENT MODULE FOR PRODUCING POWER FOR A SHIP, AND ASSOCIATED SHIP ASSEMBLY

CROSS-REFERENCE TO RELATED APPLICATIONS

This application is a National Phase entry of International Application No. PCT/EP2010/054696, filed on Apr. 9, 2010, which claims priority to French Patent Application Serial No. 0952408, filed on Apr. 10, 2009, both of which are incorporated by reference herein.

BACKGROUND AND SUMMARY

The present invention relates to the power supply systems for providing power to a ship. More particularly, the invention relates to power production modules adapted to be connected to a ship to supply the power necessary for their propulsion and their operation.

These days, numerous ships comprise propulsion means fed by a power production plant. Most of the time, such a plant is mounted fixed on the ship itself. But it can be advantageous, according to the type of ship or production plant, for the plant to be decouplable from the ship, especially in the case of nuclear propulsion ships. In fact, the use of nuclear energy can create substantial restrictions, such as being denied access to some ports, lengthy immobilisation of the ship during maintenance of the plant or reloading of fuel, etc.

Power production plants mounted on an independent ship have therefore been proposed. Document WO 01/49562 proposes an assembly of ships comprising especially a barge and a pusher ship fitted with propulsion means fed by a power production plant. The rear part of the barge complements the form of the front part of the pusher ship to make a mechanical interconnection so that said barge is pushed and moved by the pusher ship. One limitation to this solution is that it does not allow the barge to move independently of its pusher. Also, the size of such an assembly of ships is generally limited, especially because of the dissipation of energy at the level of the mechanical interconnection.

Document GB 949 645 has also proposed deploying an assembly of decouplable ships comprising a power supply ship and at least one satellite ship, each being fitted with its own propulsion means. The energy produced by the supply ship is transferred to the satellite ship by means of electric cables, creating relative independence for ships making up the ensemble. Each satellite ship further comprises an additional power production plant allowing it to decouple temporarily from the supply ship, and can be a submarine or a large boat. However, displacement of the supply ship and of the satellite ship or ships can be complicated, for example when weather conditions are poor, and make it difficult to execute the transfer of power. Further, the energy necessary for moving the supply ship and the satellite ship is greater than the power needed to move a single ship.

The aim of the invention is therefore to rectify these difficulties posed by the prior art. For this, the invention proposes a power production module decouplable from a ship, capable of providing the ship with a power necessary for its propulsion, which can be adapted to any type of ship, and in particular to large ships such as cargo freighters, container ships or passenger ships.

Another aim of the invention is to propose a power production module decouplable from a ship enabling simple transfer of power and in all circumstances, especially when weather conditions are difficult. So, according to a first aspect, the invention proposes an electric power production module for a main ship able to supply the power necessary for propulsion of said main ship,

- the module being made in the form of a secondary ship independent of the main ship and comprising a power production plant,
- the secondary ship being fitted with electrical connection means for making an electrical connection between the plant and the main ship and locking means on the main ship to make it solid with said main ship when in motion, in which the electrical connection means are adapted to supply propulsion means of the main ship with electric power.

Some preferred, though non-limiting, aspects of the power production module according to the invention are the following:

- the secondary ship further comprises propulsion means allowing it to move independently of the main ship; and
- the power production plant is a nuclear plant, a gas plant or a hydrogen plant.

According to a second aspect, the invention proposes an assembly of ships comprising a main ship and a secondary ship, said secondary ship being a module according to the invention, the main ship comprising means for receiving the secondary ship.

Some preferred, though non-limiting, aspects of the assembly of ships according to the invention are the following:

- the means for receiving the secondary ship are located in a rear or lateral part of the main ship;
- the main ship comprises a receptacle whereof the form complements the form of the secondary ship, so that when the locking means lock the secondary ship onto the main ship, the secondary ship does not present a surface opposing the advance of the assembly of ships;
- when the locking means lock the secondary ship onto the main ship, the secondary ship remains launched;
- the locking means of the main and secondary ship are configured so that when the locking means lock the secondary ship onto the main ship, the secondary ship is pulled by the main ship;
- the main ship comprises a invert enabling it to receive the secondary ship in an internal space; and
- the main ship comprises an additional power production plant designed to feed the propulsion means of the main ship in port, the propulsion performance then being substantially less than when said propulsion means of the main ship are fed by the plant of the secondary ship.

BRIEF DESCRIPTION OF THE DRAWINGS

Other characteristics, aims and advantages will emerge more clearly from the following detailed description, and with respect to the attached diagrams given by way of non-limiting examples and in which.

DETAILED DESCRIPTION

Figure 1:
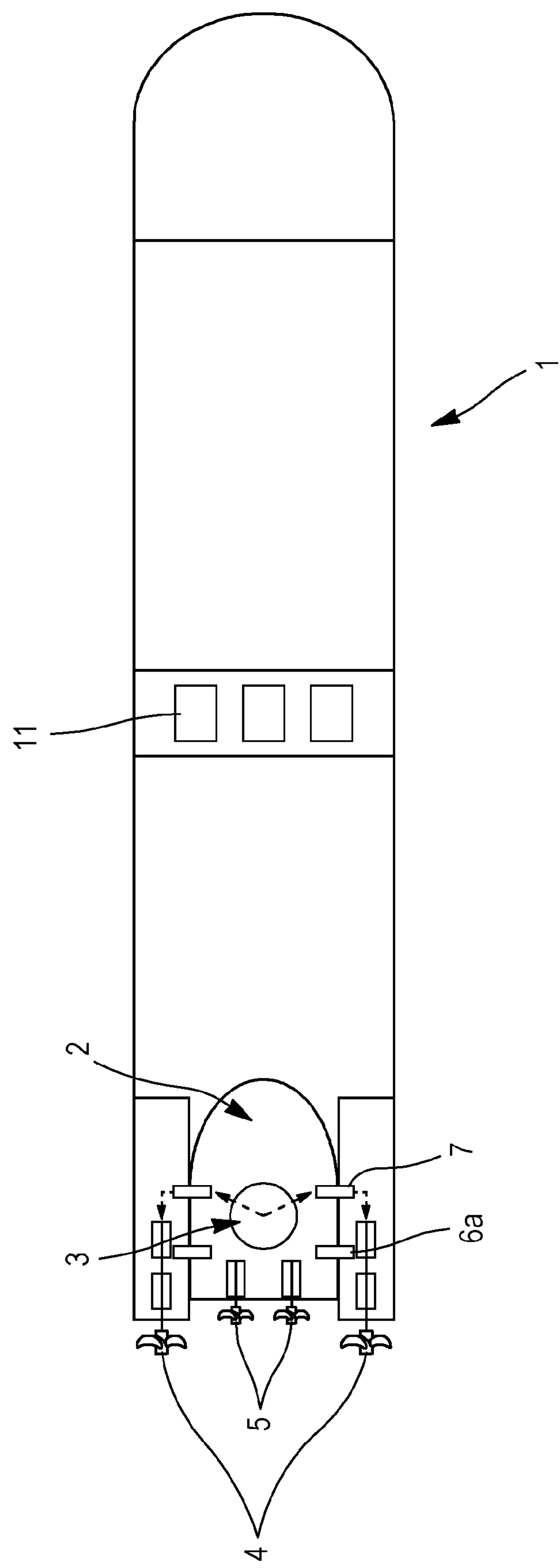
FIG. 1 is a plan view in section of a first embodiment of an assembly of ships according to the invention in travel configuration.

The present invention can apply to any type of ship. The invention is however particularly advantageous for large-size ships such as cargo ships, container ships, military ships, cruise ships or even ferries.

A power production module 2 according to the invention comprises a power production plant 3 capable of supplying power necessary for propulsion of a ship 1, called a main ship. The power and type of the power production plant 3 are adapted to the needs of the main ship 1 to which it transfers energy. For example, the power production plant 1 can be a nuclear plant in the case where the main ship 1 is a large-size ship such as a cargo ship. Alternatively, the plant can be a gas plant, a hydrogen plant or any other power source. The power production module 2 is made in the form of a ship, said secondary ship 2, independent of the main ship 1, and is fitted with electrical connection means 7 for making an electrical connection between the power production plant 3 and the main ship 1 to supply propulsion means 4 of the main ship 1 with electric power.

Advantageously, the secondary ship 2 is small in size. Typically, it is smaller than the main ship 1 and can be of a length between approximately a tenth and a fifth of the length of the main ship.

Optionally, the secondary ship 2 can also comprise propulsion means 5 enabling it to move autonomously, especially when it is not connected to a main ship. The plant 3 of the secondary ship 2 supplies power only to its own propulsion means 5. It is noted however that the propulsion means 5 of the secondary ship 2 are not adapted for moving the main ship 1: the secondary ship 2 is not actually designed to push or pull the main ship 1, but only to supply it with the power necessary for its propulsion means 4. In the absence of propulsion means 5, the secondary ship 2 moves by means of one or more towboats when not connected to a main ship 1.

In addition, the secondary ship 2 and the main ship 1 comprise complementary locking means 6*a*, 6*b* for making the secondary ship 2 solid when the main ship 1 is moving, so that displacement of the main ship 1 causes displacement of the secondary ship 2. According to a first embodiment, illustrated in FIG. 1, the locking means 6*a* rigidly and solidly fix the secondary ship 2 to the main ship 1. This connection can be made in any part of the ship 1, for example in a rear or lateral part of the main ship 1. The locking means 6*a* comprise mechanical connection means placed in the rear part (respectively lateral) of the main ship.

For example, the form of a front part of the secondary ship 2 is complementary to the form of the rear part of the main ship 1. Such complementary forms can especially be a female cavity and a male projection arranged respectively in the rear part of the main ship 1 and the front part of the secondary ship 2, or vice versa.

Figure 2:
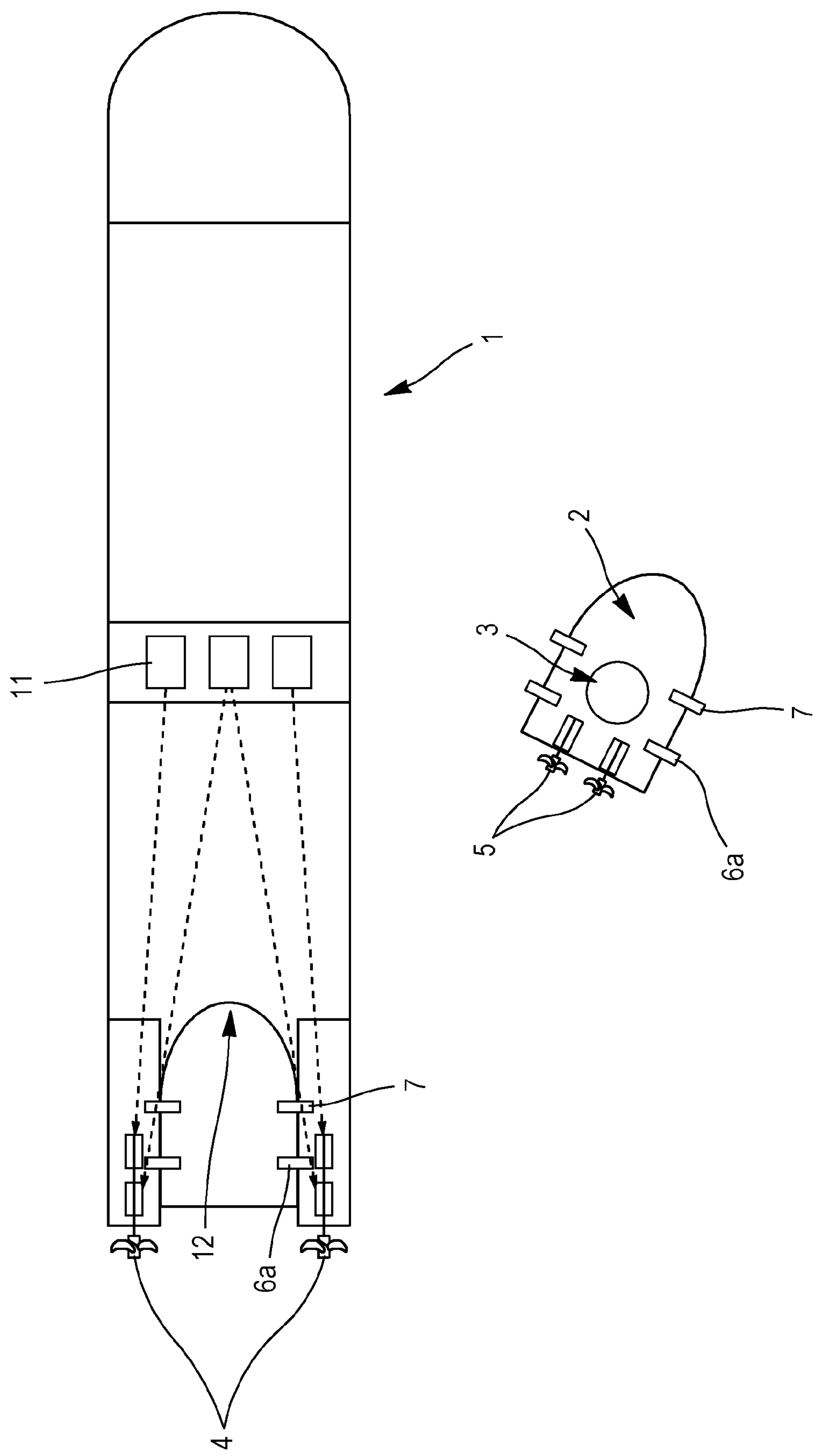
FIG. 2 is a plan view in section of the first embodiment of an assembly of ships according to the invention in port.

Alternatively, as illustrated in FIGS. 1 and 2, the main ship 1 comprises a receptacle 12 which can especially be arranged in the rear part (respectively lateral) which is complementary to the overall form of the secondary ship 2, so that the secondary ship 2 is completely enclosed in the main ship 1 when joined together in travel configuration, as illustrated in FIG. 1, the rear part (respectively lateral) of the secondary ship 2 being placed substantially in the plane of the rear part (respectively lateral) of the main ship 1. The secondary ship 2 then forms an integral part of said main ship 1.

Irrespective of the variant embodiments, when the mechanical connection means 6*a* between the ships are connected, the main ship 1 and the secondary ship 2 are rigidly joined and form a single ship assembly moving together. Since the secondary ship 2 is smaller than the main ship 1, when it is locked onto the main ship the secondary ship 2 (preferably) presents no surface opposing the advance of the assembly of ships, and therefore generates only low mechanical forces at the level of the connection 6*a* with the main ship 1.

Also, the secondary ship 2 preferably stays launched when it is locked onto the main ship 1. Thus, when in motion, the secondary ship 2 can reduce the forces exerted on the locking means 6*a* by partially using the power produced by the plant 3 for executing its own propulsion means 5. But this does not mean that the secondary ship 2 acts as pusher and/or puller of the main ship 1, since, as is known, the propulsion means 5 of the secondary ship 2 are not adapted to such an operation.

Finally, in this embodiment the electrical connection means 7 can for example be arranged on the rear and front parts of the principal 1 and secondary ships 2 respectively, so as to make the electrical connection between the plant 3 of the secondary ship 2 and the main ship 1. This position of the connection means 7 is not limiting. These means 7 can by way of variant be arranged on an upper part of the secondary ship 2 and a part complementary to the main ship 1, or at any other point adapted to both ships 1 and 2. Similarly, the locking means can be placed at different points of the principal 1 and secondary 2 ships, and can be many or few according to the respective size of the ships 1 and 2, the locking means type, etc.

Figure 3:
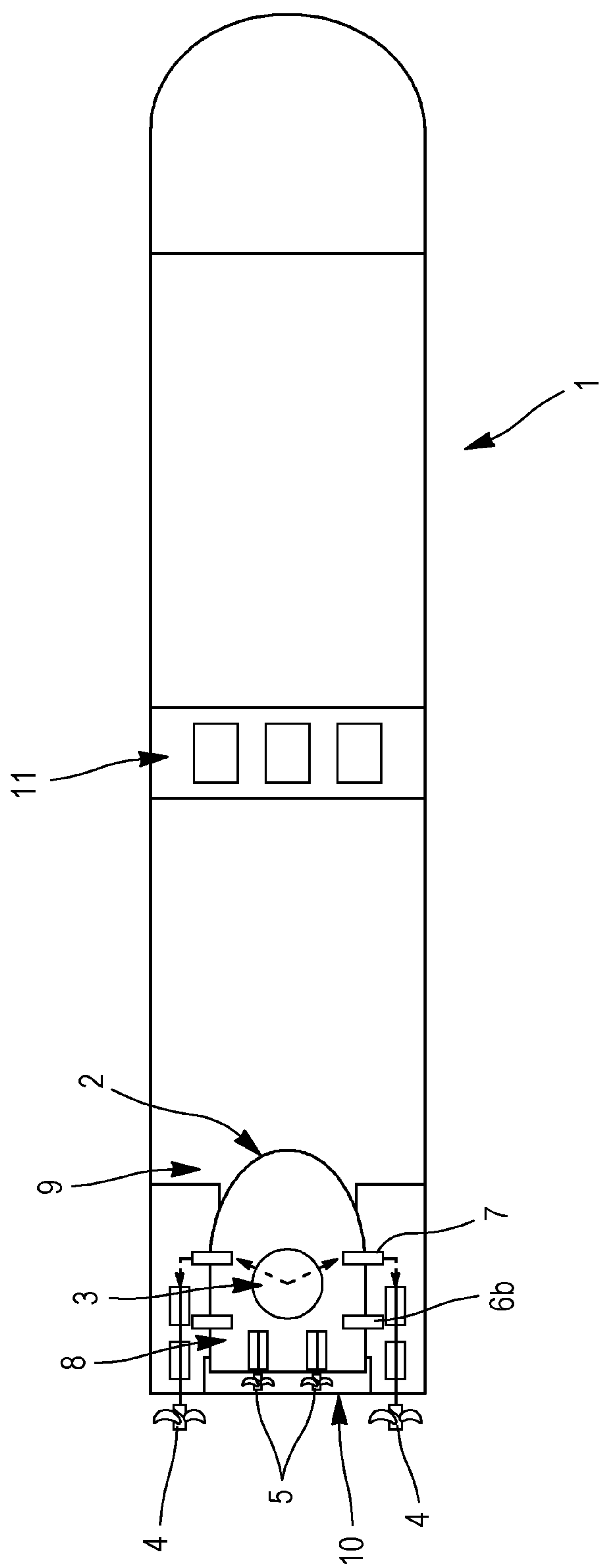
FIG. 3 is a plan view in section of a second embodiment of an assembly of ships according to the invention in travel configuration.
Figure 4:
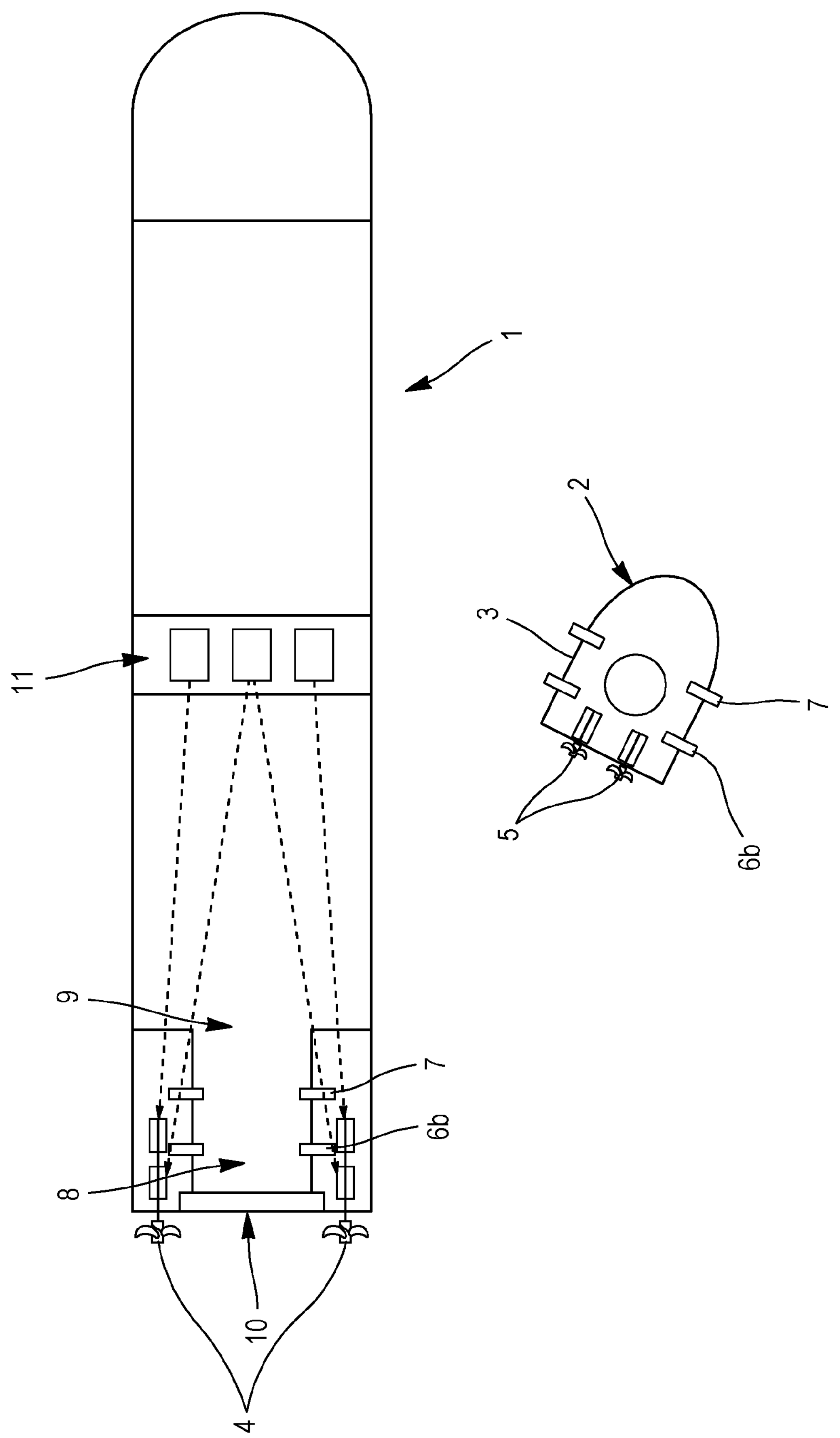
FIG. 4 is a plan view in section of the second embodiment of an assembly of ships according to the invention in port.

According to another embodiment, illustrated in FIGS. 3 and 4, the main ship 1 comprises an invert 8 adapted for receiving the secondary ship 2. The secondary ship 2 is placed in an internal space 9 of the main ship 1. Here, invert means an immersible invert, that is, an interior tank constituting a floating dock. Immersing the invert 8 and stowing it out of the water allows docking and undocking of floating engines to be transported, such as the secondary ship 2.

For this, the main ship 1 comprises a door 10 giving access to the invert 8 of the secondary ship 2. The door 10 and the invert 8 are preferably arranged in a rear part of the main ship 1. The secondary ship 2 can then remain either launched in the invert 8, or can be stowed out of the water.

Alternatively, the door 10 and the invert 8 are arranged in another part of the main ship, such as a front part, lateral part, etc. The invert 8 can for example be fitted with conventional locking means 6*b* ensuring the secondary ship 2 is held in the invert of the main ship 1, such as a stowing system. But holding the secondary ship 2 in the main ship 1 by means of the locking means 6*b* is not necessarily rigid since the secondary ship 2 is necessarily solid in displacement with the main ship 1 (given that it is lodged in the invert 8).

It also comprises electrical connection means 7 with the secondary ship 2 ensuring the electrical connection between the plant 3 of the secondary ship 2 and the main ship 1. Again, in this configuration, the principal 1 and secondary ships 2 move conjointly, the secondary ship 2 being carried by the main ship 1 in which it is stowed.

Likewise, according to the present invention, at the same time the main ship 1 can comprise locking means 6*a* placed on its rear part and locking means 6*b* arranged in an internal space 9 of said ship 1, so as to be able to accommodate all embodiments of secondary ships. In particular, the main ship 1 can accommodate the same secondary ship 2 in one or the other of these positions.

Alternatively, the main ship 1 can be connected to several secondary ships at the same time. For example, a first secondary ship can be locked to the rear part of the main ship 1 (according to the first embodiment illustrated in FIG. 1), whereas a second secondary ship can be placed in the internal space 9 of the main ship (in keeping with the second embodiment illustrated in FIG. 3).

In all embodiments, in travel configuration, in which the secondary ship 2 is rigidly fixed to the main ship 1, the power production plant 3 supplies the propulsion means 4 of the main ship with power. The propulsion means 4 of the main ship 1 can be electric motors designed to be connected electrically to the connection means 7 in travel configuration. Alternatively, the propulsion means can be of a different type, with power conversion means being placed between the propulsion means 4 and the electrical connection means 7.

The assembly of ships formed by the main ship 1 and the secondary ship 2 is therefore shifted by the propulsion means 4 of the main ship 1 fed by the power production plant 3 of the secondary ship 2. Consequently, the secondary ship 2 is slaved to move with the main ship 1. This displacement constraint imposed to the secondary ship 2 is especially possible due to mechanical locking, making the secondary ship 2 rigidly solid with the main ship 1, whether it is according to the embodiment of FIG. 1 or that of FIG. 3.

For this to happen, the locking means 6*a*, 6*b* are configured to be sufficiently resistant to be able to be submitted on the long term to the forces exerted by the secondary ship 2 when being moved by the main ship 1, irrespective of weather conditions. Advantageously, the locking means 6*a*, 6*b* are adapted to the respective characteristics of the secondary ship 2 and principal ship 1 (form, mass, loading, volume, dunnage, speed, type of trip made, etc.).

The main ship 1 can further comprise an additional power production plant 11 allowing it to navigate independently of the secondary ship 2. The additional plant 11, generally less powerful than the power production plant 3 of the secondary ship 2, suffices to feed the propulsion means 4 of the main ship on short trips, or in the event of breakdown of the power production plant 3, propulsion performance being substantially less than when said propulsion means 4 of the main ship 1 are fed by the plant 3 of the secondary ship 2.

The power and the type of additional power production plant 11 on board the main ship 1 are dimensioned and adapted to the needs of the main ship 1 in port or if damage were to render the power production module 2 partially or totally inoperable. In particular, the additional plant 11 is capable of serving only the sole needs of its own on-board electric network and its propulsion means during short trips, moving at reduced speed, etc. For example, the additional plant 11 is adapted to allow the main ship 1 to enter a port. It is also adapted in other configurations requiring limited propulsion performance such as the handling the ship 1 or its return to port despite damage to the power production module 2.

For example, the additional plant 11 is a fuel plant such as a set of assemblies electrogenic equipped with a diesel-alternator motor. The type of additional power production plant 11 which is installed on board the main ship 1 is preferably compatible with the propulsion means 4 of the main ship 1. On the contrary, the main ship 1 further comprises power conversion means between the propulsion means and the additional production plant 11 of the main ship 1.

Therefore, the main ship 1 can decouple from the secondary ship 2 if conditions demand and can navigate autonomously. Such conditions can be entry to port prohibiting nuclear plants, fuel recharging for the plant 3, etc.

For example, when the assembly of ships arrives at its destination or on approach to a coast, the main ship 1 can "jettison" the secondary ship 2 by unlocking the locking means 6*a*, 6*b*, disconnecting the electric lines 7, and if required by launching the secondary ship 2 by opening the door 10 of the invert 8. In this port configuration, the principal 1 and secondary ships 2 are then free to move about independently of one another. Thus, when in port, the main ship 1 changes back to a conventional ship propelled for example by means of the additional plant 11, which simplifies its access to ports especially, while the secondary ship 2 becomes an autonomous ship.

In the case for example of a large fleet of ships, decoupling the main ship 1 and its power production plant 3 (i.e. of the secondary ship 2) simplifies maintenance or reloading operations of the plant 3. In fact it is no longer necessary to stop the main ship 1, as it suffices to replace (via simple standard exchange) the secondary ship 2 prior to undergoing operations by another secondary ship already operational. Autonomous propulsion of secondary ships also makes this exchange all the simpler and more rapid to carry out, and when their plant is for example a gas, hydrogen or nuclear plant, further allows them to put into specific recharging terminals. Finally, recharging reactors (nuclear, hydrogen, etc.) can also be carried out in improved safety conditions and without immobilising the main ship 1, since this recharging no longer needs to be executed while the plant 3 is connected to the main ship 1.

The invention claimed is:

1. An electrical power production module for a main ship which can supply electrical power necessary for propulsion of the main ship, the module comprising:

a secondary ship independent of the main ship and comprising a power production plant and an electrical connector, the electrical connector making an electrical connection between the power production plant of the secondary ship and the main ship, the power production plant of the secondary ship supplying a propulsion motor of the main ship with electric power via the connector, the secondary ship further comprising a lock making the secondary ship integral with the main ship when moving the main ship.

2. The module as claimed in claim 1, wherein the secondary ship further comprises another propulsion motor allowing it to move about independently of the main ship.

3. The module as claimed in claim 1, wherein the power production plant is one of: a nuclear plant, a gas plant or a hydrogen plant.

4. An assembly of ships comprising:

a main ship and a secondary ship, the main ship and the secondary ship being independent from each other, the main ship comprising a receptacle operably receiving the secondary ship and a lock making the main ship integral with the secondary ship when moving the main ship, the secondary ship comprising a power production plant and an electrical connector, the electrical connector connecting the power production plant of the secondary ship to the main ship, the electrical connector supplying a propulsion motor of the main ship with electricity.

5. The assembly of ships as claimed in claim 4, wherein the receptacle is located in one of a rear or lateral part of the main ship.

6. The assembly of ships as claimed in claim 4, wherein the receptacle complements the form of the secondary ship, so that when the lock locks the secondary ship onto the main ship, the secondary ship does not present a surface opposing the advance of the assembly of ships.

7. The assembly of ships as claimed in claim 4, wherein when the lock locks the secondary ship onto the main ship, the secondary ship remains launched.

8. The assembly of ships as claimed in claim 4, wherein the lock of the main ship and secondary ship is configured such that when the lock locks the secondary ship onto the main ship, the secondary ship is pulled by the main ship.

9. The assembly of ships as claimed in claim 4, wherein the main ship comprises an invert enabling it to receive the secondary ship in an internal space.

10. The assembly of ships as claimed in claim 4, wherein the main ship comprises an additional power production plant designed to supply the propulsion motor of the main ship in port, propulsion performance then being substantially less than when the propulsion motor of the main ship is supplied by the plant of the secondary ship.

11. An assembly comprising:

a first ship comprising a nuclear power plant, a first propulsion motor, and a receptacle, the nuclear power plant being electrically connected to the first propulsion motor and operable to supply electric power to the first propulsion motor thereby enabling the first ship to move;

a second ship comprising a non-nuclear power plant and a second propulsion motor, the non-nuclear power plant being electrically connected to the second propulsion motor and operable to supply electric power to the second propulsion motor thereby enabling the second ship to move; and a lock operable to connect the first ship and the second ship to form an integral ship assembly when the second ship is received into the receptacle of the first ship, the non-nuclear power plant of the second ship being electrically connected to the first propulsion motor of the first ship and operable to supply the first propulsion motor of the first ship with electric power thereby enabling the integral ship assembly to move.

12. The assembly of claim 11, wherein the receptacle of the first ship is located in one of a rear or lateral part of the first ship.

13. The assembly of claim 11, wherein the receptacle complements a form of the second ship such that when the lock connects the first ship and the second ship, the second ship does not present a surface opposing an advance of the integral ship.

14. The assembly of claim 11, wherein the lock connects the first ship and the second ship such that the second ship remains launched.

15. The assembly of claim 11, wherein the lock connects the first ship and the second ship such that the second ship is pulled by the first ship.

16. The assembly of claim 11, wherein the first ship is larger than the second ship.

* * * * *